(12) United States Patent
Roos

(10) Patent No.: US 6,438,126 B1
(45) Date of Patent: Aug. 20, 2002

(54) ARRANGEMENT AND METHOD RELATING TO COMMUNICATIONS SYSTEMS

(75) Inventor: Sture Roos, Bergshamra (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/057,137

(22) Filed: Apr. 8, 1998

Related U.S. Application Data

(63) Continuation of application No. PCT/SE96/01286, filed on Oct. 9, 1996.

(30) Foreign Application Priority Data

Oct. 9, 1995 (SE) ................................................ 9503532

(51) Int. Cl.$^7$ ............................................... H04L 11/22
(52) U.S. Cl. ...................... 370/369; 370/372; 370/386
(58) Field of Search ................................. 370/217, 218, 370/219, 225, 227, 228, 360, 369, 372, 375, 386, 387, 388

(56) References Cited

U.S. PATENT DOCUMENTS

| | | | |
|---|---|---|---|
| 4,201,889 A | * | 5/1980 | Lawrence et al. .......... 370/351 |
| 4,983,961 A | | 1/1991 | Brünle et al. |
| 5,229,990 A | | 7/1993 | Teraslinna |
| 5,361,249 A | | 11/1994 | Monastra et al. |
| 5,408,462 A | | 4/1995 | Opoczynski |
| 5,436,886 A | | 7/1995 | McGill |
| 5,691,973 A | * | 11/1997 | Ramstrom et al. .......... 370/400 |

* cited by examiner

Primary Examiner—Wellington Chin
Assistant Examiner—Frank Duong
(74) Attorney, Agent, or Firm—Burns, Doane, Swecker & Mathis, L.L.P.

(57) ABSTRACT

A communications switching system includes a switching network and a number of access units. The switching network includes a number of multiplexing arrangements and a number of switching arrangements. In order to provide redundancy in the system, a number of multiplexing and switching arrangements are built together to form a number of combined multiplexing and switching arrangements, and a common protection switching arrangement is arranged to provide protection switching both between access units and multiplexing switching arrangements and between access units and accessing networks.

21 Claims, 3 Drawing Sheets

ARRANGEMENT AND METHOD RELATING TO COMMUNICATIONS SYSTEMS

This application is a continuation of International Application No. PCT/SE96/01286, which was filed Oct. 9, 1996, which designated the United Sates, and which is expressly incorporated here by reference.

TECHNICAL FIELD

The present invention relates to communications switching systems in which redundancy is provided and to a method of providing redundancy in switching systems.

The invention also relates to an access system in which redundancy is provided.

BACKGROUND

In most systems known today redundancy is provided in different ways to different parts of the system e.g. depending on what is to be provided with redundancy or where in the system redundancy is to be provided. Generally in communications systems the central hardware is duplicated (or even triplicated). For example multiprocessor arrangements are used in which one processor is active whereas the other(s) is/are passive until the operative unit can not operate properly or if an error is detected etc. in which cases a switch is done to one of the standby units. However, further away from the central parts of the switching system redundancy is rarely applied and particularly the access units are not provided with any kind of redundancy at all However, it is known from different systems to make the duplication of arrangements more or less remote from the central parts to a question of costs. Since duplication of equipment considerably increases the costs, redundancy is however often provided only to a limited extent, i.e. to the more central parts of the system U.S. Pat. No. 4,983,961 describes a non-blocking switching array in three stages. The number of inputs/outputs for the subarrays of its input/output stages is twice the number of lines to be switched and there is one more sub-array in an intermediate stage than what is minimally required to provide a non-blocking switching array The additional inputs/outputs are connected with the non-redundant inputs/outputs so that each redundant input is connected to a non-redundant input of a respective other sub-array of the same stage. If one of the sub-arrays fails, redundant substitute parts are available.

U.S. Pat. No. 5,408,462 discloses a protection switching system comprising a number of telecommunications modules for processing and/or switching telecommunications signals. Signals are provided to a pair of modules by a first module and said pair of modules are in turn connected to a further pair of modules wherein each pair of modules comprises an operating and a stand-by module. The standby module controls the switching of all the modules in the system which require an switching in came the stand-by module is activated and a controller monitor circuit is provided for detecting faults in an operating module in which case the corresponding standby module is informed which then provides the protection switching.

However, none of the today known arrangements works satisfactorily since either there is a risk of loosing data to varying extents upon activating standby equipment or complicated, costly arrangements are provided which however do not provide redundancy throughout the system, i.e. to all parts of the system which means that some parts are totally unprotected which can give serious problems.

SUMMARY

Due to the technical progress within the electronical field the packing density of integrated circuits increases continuously. This is the case both as functions or functionalities as such are concerned as well as the number of functionalities of a given kind that can be packed on one and the same physical entity, e.g. a circuit board. A consequence hereof is that in case of mal-functioning of such a unit, the number of users or related systems that are affected increases correspondingly. In order to find a remedy to these problems either smaller physical units than provided for technically would have to be used or redundancy has to be provided in one way or another.

Since it is generally strived at taking advantage of the technological progress and being able to use physical devices that are as small as possible, it is obvious that solutions are preferable which enable the provision of redundancy.

In a communications system the amount of traffic successively increases from the access points or from the access side in direction towards the central parts of the system which means that there is a need of redundancy on a number of different locations.

What is needed is consequently a switching system in which redundancy can be provided in a simple and reliable way and at a low cost.

A system is also needed through which redundancy can be provided also to the parts farther away from the central parts.

A system is also needed which allows the use of physical units with a high or even very high packing density while still keeping the consequences in case of a failure in such a unit very low or even lower as compared to physical units having a lower packing density or generally independently of whether the packing density is high or low although the need for redundancy provision is lower if the physically units are larger and have a low packing density and thus affect fewer users, equipment etc.

A method for providing redundancy is also needed through which it can be done in a simple and reliable way and at a low cost and particularly through which also equipment far away from the central parts can be provided with redundancy in such a manner.

Therefore a communications switching system which comprises a switching network and a number of access units is provided wherein at least a number of multiplexing and switching arrangements which are included in the switching network are so arranged that they form a number of combined multiplexing switching arrangement and wherein a common protection switching arrangement provides protection switching both between access units and multiplexing switching arrangements and between the access units and networks accessing said access units.

In a particular embodiment the control signalling to the access units is effected via the protection switching arrangement and even more particularly the supply of power to the access units by the multiplexing arrangement is effected via the protection switching arrangement. The switching network comprises a number of first switching arrangement and at least one central switching arrangement which is common for a number of access units, in particular all access units of the switching system, wherein the central switching arrangement is a distribution switching arrangement via which all connections to all the access units can reach all the other connections.

According to one embodiment a second protection switching arrangement can be provided for protection switching of the central switching arrangement. This switching arrangement can then be arranged between the combined multiplexing switching arrangements and the central switching arrangement. In general an additional protection switching arrangement can be arranged as a consecutive one following on some switching arrangement that is separately protected.

According to one embodiment the first switching arrangements combined with respective multiplexing arrangements comprise time switches and the central switching arrangement may also comprise a time switch or it may comprise a space switch or any combination thereof.

In one advantageous embodiment, instead of providing separate protection switching of the central switching arrangement, the central switching arrangement is controlled by a number of time switches (first switching arrangements) connected thereto so that the combined multiplexing switching arrangement comprising the corresponding time switches provides redundancy via protection switching on the multiplexing side via the common protection switching arrangement.

In another advantageous embodiment protection switching is also provided to additional equipment which then is connected to the common protection switching arrangement in the same way and on the same side as the combined multiplexing switching arrangements. Alternatively additional equipment can be connected to any second protection switching arrangement in an analogue way.

Particularly protection switching arrangements are introduced on a number of levels in substantially the same way without affecting established connections and in such a way that the same requirements as to transmission speed can be upheld throughout the system so that the whole system is protected in one and the same manner irrespectively of level.

Access can among others be provided to one or more of POTS, ISDN, the asynchronous digital subscriber loop (ADSL) or the high speed subscriber loop (HDSL).

A communications switching system comprising a switching network and a number of access units is also provided wherein the switching network comprises a number of arrangements for multiplexing, switching etc. in which those arrangements between which there is a high speed interface are built together to form combined arrangements which are given redundancy by a common protection switching arrangement. Particularly a number of multiplexing arrangements are built together with a number of switching arrangements, more particularly time switches wherein the common protection switching arrangement is so arranged that it also acts as a protection switch towards the access units. Advantageously m+n redundancy is provided throughout the system wherein m denotes operating arrangements and n denotes redundant arrangements.

Particularly the switching network comprises at least one central distribution switching arrangement wherein a number of time switches connect to the central switching arrangement and protection switching is provided to the distributing switching arrangement via the common switching protection arrangement of the respective combined multiplexing switching arrangements.

An access system for providing communications network access is also provided which comprises a number of access units, multiplexing arrangements and switching arrangements of which one is a central switching arrangement. At least a number of multiplexing arrangements and switching arrangements connecting thereto are combined into a number of multiplexing switching arrangements (units) and a common protection switching arrangement is provided at least for a number of these combined units and it is arranged on the multiplexing side of the said units. The access units are further connected to the common protection switching arrangement so that protection switching is provided in the same way and by the same protection switching arrangement both between the multiplexing arrangements and the access units respectively and between said access units and the accessing networks etc.

The access system may comprise a separate second protection switching arrangement for the central switching arrangement. Alternatively the central switching arrangement is controlled by the time switch arrangements of the switching arrangements (of the combined units) by which it is owned so that protection switching for the distribution switching arrangement is also done via protection switching on the multiplexing side of the combined units. The central switching arrangement particularly comprises a space switch. Alternatively it comprises a combination of time and space switches.

For the same reasons as referred to at the beginning of this section a method of providing redundancy in a switching system of a telecommunications system is provided. The switching system comprises a number of access units and a number of switching arrangements. The method comprises the steps of building together at least some of those arrangements of the switching system which have an interface to another arrangement which is a high transmission speed interface into combined units and introducing protection switching arrangements on different levels of the system in one and the same way irrespectively of which is the level, e.g. for protection of central arrangements of the switching system or accessing units or anything there between so that the requirements as to the transmission speed be the same throughout the system. Advantageously at least a number of multiplexing arrangements are combined with a number of switching arrangements respectively connecting thereto over a high speed interface wherein the switching arrangements for example may be time switches so that they form common units and moreover arranging a common protection switching arrangement for these combined units which provides protection switching both for these combined units and for a number of access units so that the protection switching is handled by the common protection switching arrangement in one and the same way both between multiplexing arrangements and the access units and towards accessing networks.

In an advantageous embodiment controlling of a central switching arrangement of the system such as a distribution switching arrangement is done from the combined multiplexing time switch units owning the switching in the distribution switching arrangement so that protection switching for the distribution switching arrangement likewise is provided by the common protection switching arrangement.

BRIEF DESCRIPTION OF THE DRAWINGS

The invention will in the following be further described in a non-limiting way under reference to the accompanying drawings in which.

DETAILED DESCRIPTION

Figure 1:
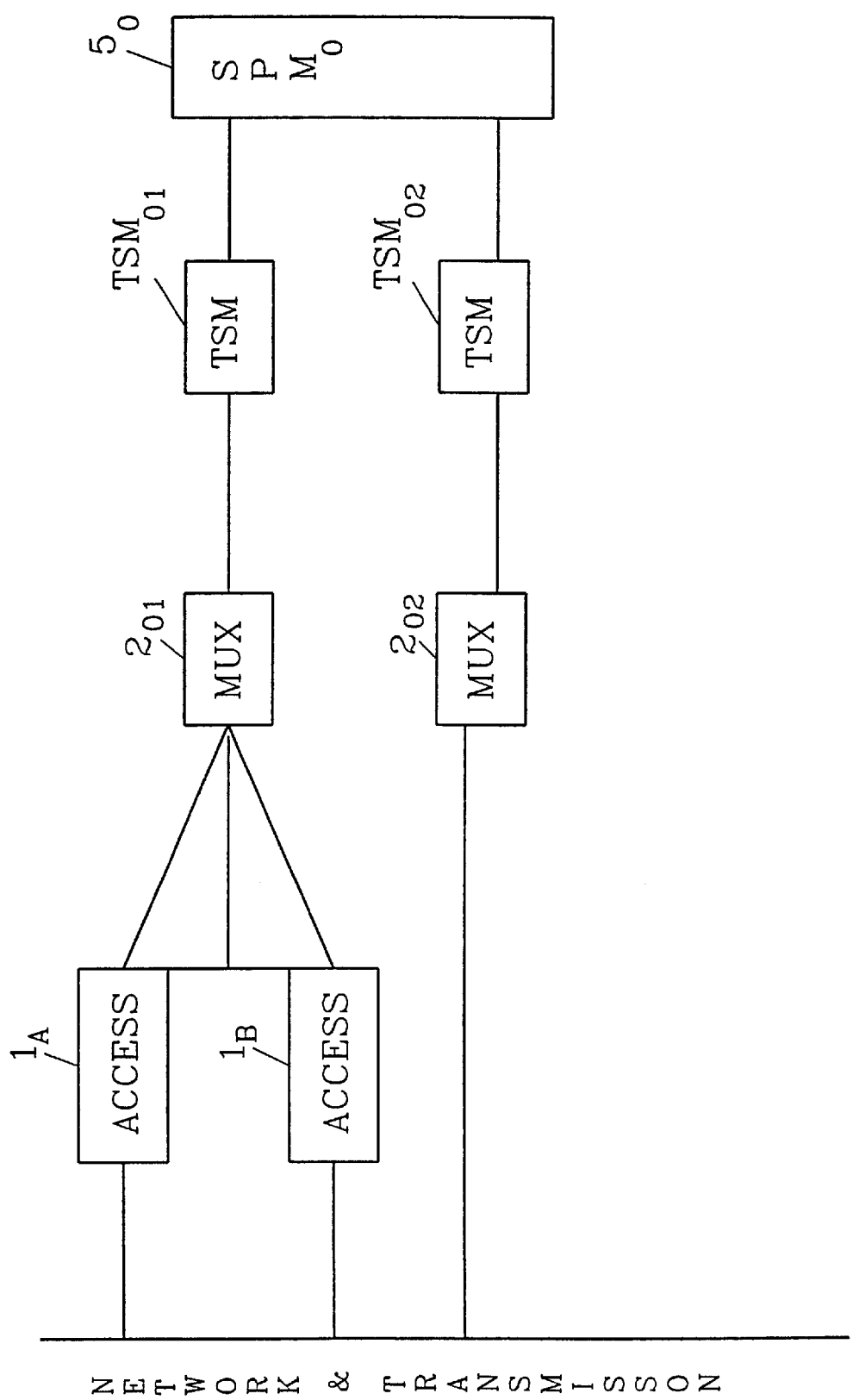
FIG. 1 illustrates a switching system without redundancy.

FIG. 1 illustrates a switching system of a telecommunications system in a very schematical way. In FIG. 1 no redundancy provision is included for explanatory reasons. It should however be clear that the following e.g. relating to accesses etc. relates to systems protected according to the invention. Controlling arrangements are also not included. Via access units $1_A$ and $1_B$ access can for example be provided to POTS (plain old telephone system), ISDN (integrated services digital network), ADSL (asynchronous digital subscriber loop), HDSL (high speed subscriber loop) etc. Of course a number of other accesses are also possible. The transmission systems comprising multiplexers $2_{01}$, $2_{02}$ can also be of different types such as for example 2 Mbps, 34 Mbps, STM-1 etc.

Figure 2:
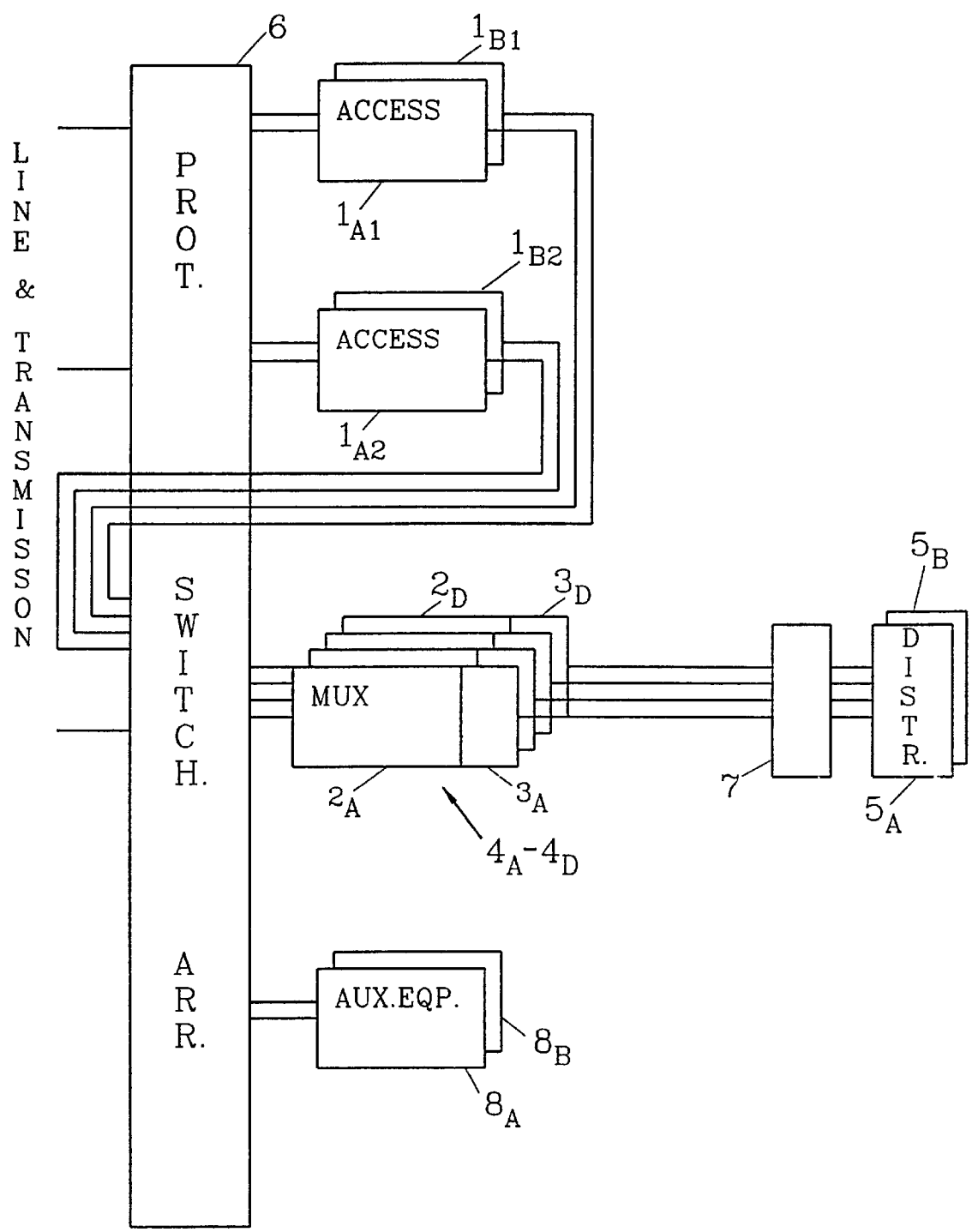
FIG. 2 illustrates a first embodiment of a switching system as In FIG. 1 but with redundancy and FIG. 3 illustrates a second embodiment of a switching system with redundancy according to the invention

A digital system comprises a number of time switches $TSM_{01}$, $TSM_{02}$, on one or more levels and these time switches in the illustrated example connect to a space switch or a space switch module $SPM_D$. This does not have to be a space switch but it could also be a time switch. It is however essential that somewhere in the switching system there is a particular point in which physically seen everyone can reach everyone. This central switching arrangement $5_D$ is the distribution point of the switching system and the amount of traffic is increasing successively from the access side towards this central part of the system. Redundancy is then required on a number of different locations in the system and the higher the packing density on the physical units, for example circuit boards, the higher the need of redundancy farther away from the central part i.e. the distribution point. Even for the access units redundancy may be required, FIG. 2 illustrates a first embodiment according to the invention. A number of multiplexing units MUX $2_A$, $2_B$, $2_C$, $2_D$ are combined with each a first switching arrangement $3_A$, $3_B$, $3_C$, $3_D$ respectively among others because the interfaces between the respective multiplexers and first switching arrangements are high speed transmission interfaces. The first switching arrangements $3_A$–$3_D$ are time switches or time switch modules (TSM). These combined units $4_A$–$4_D$ are on the multiplexing side connected towards a common protection switching arrangement 6. The combined units can be built together in a number of different ways, e.g. via a standardized 2 Mbps interface such as G.703 or G.704 (ITU-T, International Telecommunications Union).

The access units $1_{A1}$, $1_{B1}$ and $1_{A2}$, $1_{B2}$ respectively are also connected or assembled towards the same protection switching arrangement 6 in such a way so that the protection switching arrangement 6 forms a common protection switch which handles both the protection towards the networks and between the access units and the multiplexers in one and the same way.

The multiplexing arrangements for the network and the access units thus form a common pool of redundant units. Advantageously power supply from the multiplexing arrangement to the access units is done via the protection switching arrangement 6 in order to also provide redundant power supply. In an advantageous embodiment auxiliary equipment $8_A$ can also be provided with redundancy $8_B$ via connection to the same common protection switching arrangement 6 Moreover, control signalling to the access units is effected via the protection switching arrangement 6. In the embodiment as illustrated in FIG. 2 the central switching arrangement e.g. the distributing switching arrangement is however provided with a separate protection switching arrangement 7 to provide redundancy via switching between, here two, distributing switching arrangements $5_A$, $5_B$. The distributing switching arrangement 5 is here supposed to be a space switch or a space switch module SPM. According to other embodiments it can however also be a time switch or it can be formed by any combination of time and space switches.

Figure 3:
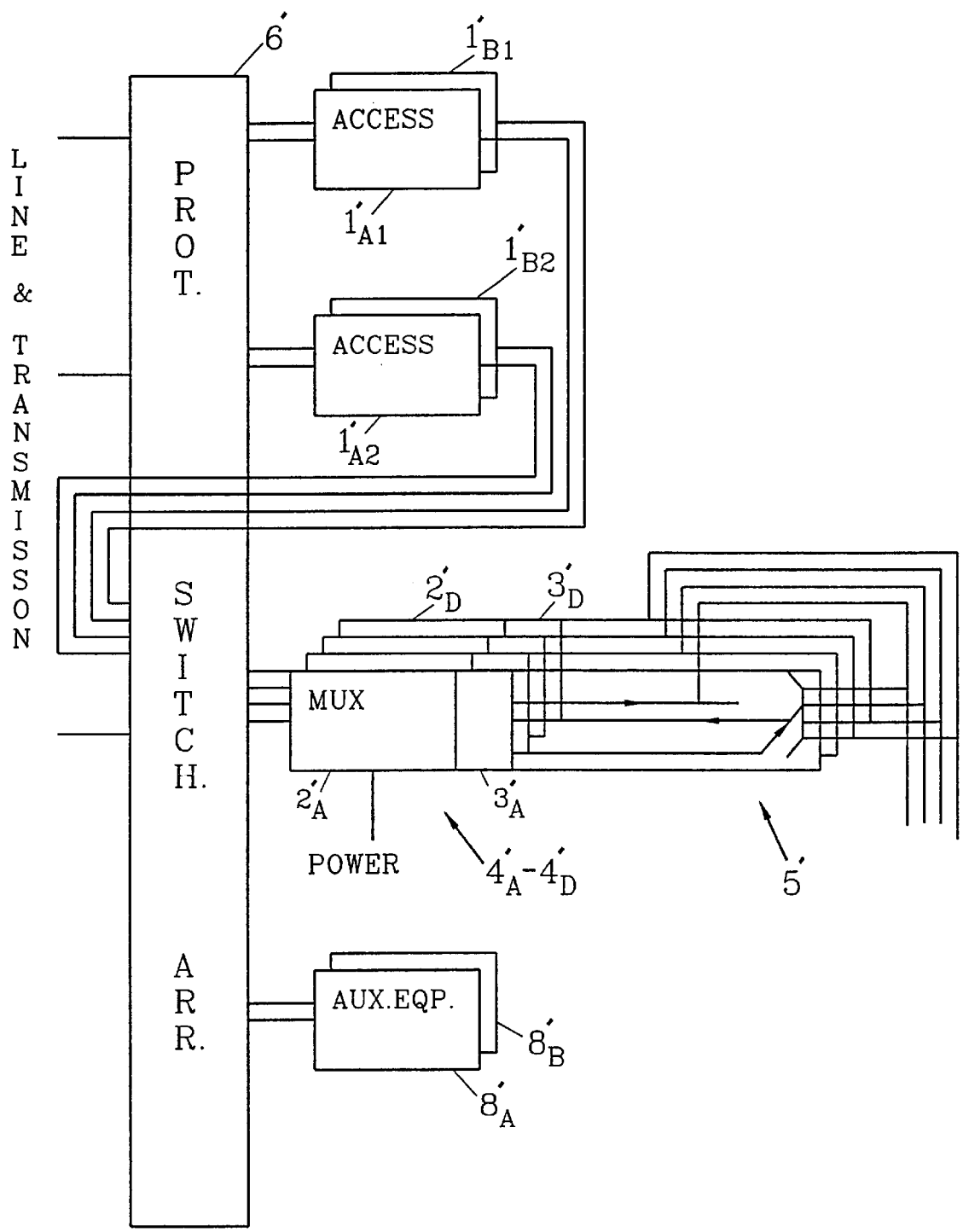

The protection switching arrangement is passive in its normal state which means that failures in common parts do not affect established connections In FIG. 3 an alternative embodiment is illustrated. This embodiment in general corresponds to the embodiment of FIG. 2 but with the essential difference that no separate protection switching arrangement is needed for the central or distributing switching arrangement which for example is a space switch.

The space switch 5' is here controlled by the arrangement owning it by which is understood the first switching arrangement (and the multiplexing arrangement with which it is combined) that wants to be switched and then the space switch 5' indirectly is provided with redundancy via the combined units $4'_A$–$4'_D$ by which it is owned and shifting is done via the common protection arrangement 6' on the multiplexing side. This means that the space switch module 5' is controlled and also supplied with power via the combined multiplexing switching module $4'_{A-D}$ and if a failure occurs here, transmitting and/or receiving combined multiplexing switching modules 4' are switched. This means that the multiplexing arrangement and the corresponding time switch or first switching arrangement are exchanged via the common protection switching arrangement altogether. The common protection switching arrangement thus operates in the same way for all the arrangements of the switching system that are connected thereto. All connection lines of the combined units and the distribution switching arrangement are connecting to all of the other arrangements as affected by the protection switching arrangement. Auxiliary equipment which also can be connected thereto can practically be any, such as for example testing equipment, announcing machines, dual-tone multi-frequency dialling equipment etc.

Thus, with the present invention m+n redundancy can be provided throughout the switching system wherein m relates to operating arrangements and n to redundant arrangements. In a particular embodiment duplication is provided but n can particularly be any number from one and upwards.

The invention is of course not limited to the shown embodiments but it can be varied in a number of ways within the scope of the claims.

What is claimed is:

1. Communication switching system comprising a switching network and a number of access units communicating with a number of communication channels for accessing at least one network, said switching network comprising a number of multiplexing arrangements for channel multiplexing, a number of first switching arrangements and at least one central switching arrangement common for the number of access units, wherein at least a number of multiplexing and switching arrangements are arranged so as to form a number of combined multiplexing switching arrangements, and a common protection switching arrangement is arranged to provide protection switching both between access units and multiplexing switching arrangements and between access units and the at least one network.

2. System according to claim 1, wherein control signalling to the access units is effected via the common protection switching arrangement.

3. System according to claim 1, wherein power supply to the access units by the multiplexing arrangement is effected via the common protection switching arrangement.

4. System according to claim 1, wherein the central switching arrangement is a distribution switching arrangement.

5. System according to claim 1, wherein a second protection switching arrangement is provided for protection switching of the central switching arrangement.

6. System according to claim 5, wherein the second protection switching arrangement is arranged between the combined multiplexing switching arrangements and the central switching arrangement.

7. System according to claim 1, wherein at least a number of the first switching arrangements comprise time switches or time switches or time switch modules.

8. System according to claim 7, wherein the central switching arrangement comprises a time switch module.

9. System according to claim 8, wherein the central switching arrangement comprises a space switch module.

10. System according to claim 9, wherein the central switching arrangement comprises any combination of time and space switches respectively.

11. System according to claim 7, wherein the central switching arrangement is controlled by the time switches connecting thereto so that the combined multiplexing switching arrangement comprising the corresponding time switches provide redundancy via the common protection switching arrangement on the multiplexing side.

12. System according to claim 1, wherein protection switching is provided to additional equipment connected to any of said protection switching arrangements.

13. System according to claim 1, wherein protection switching arrangements, common or not, are introduced on a number of levels in substantially the same way without affecting established connections and so that the same requirements as to transmission speed can be upheld substantially throughout the switching system and the whole system is protected in the same manner irrespectively of level.

14. System according to claim 1, wherein the accessing networks are one or more of a Plain Old Telephone System and an Integrated Services Digital Network.

15. System according to claim 1, wherein access is provided to one or more of the asynchronous digital subscriber loop or the high speed subscriber loop.

16. Access system for providing communications networks access, comprising a number of access units, multiplexing arrangements and switching arrangements comprising at least one central switching arrangement, wherein at least a number of multiplexing arrangements and switching arrangements are arranged so as to form a number of combined multiplexing-switching arrangements, and a common protection switching arrangement is provided on the multiplexing side of the combined multiplexing-switching arrangements, and the access units further are connected to the common protection switching arrangement so that protection switching is provided by the same protection switching arrangement both between the combined multiplexing-switching arrangements and the access units and for the access units towards the communications networks.

17. Access system according to claim 16, wherein a separate, second protection switching arrangement for the central switching arrangement is provided between the combined units and the central switching arrangement.

18. Access system according to claim 16, wherein the central switching arrangement is controlled by the time switch arrangements of the switching arrangements so that the common protection switching arrangement via a protection switching on the multiplexing side is provided also to the central switching arrangement.

19. Access system according to claim 18, wherein the central switching arrangement comprises a space switch.

20. Method of providing redundancy in a switching system of a telecommunications network, wherein said switching system comprises a number of access units and a number of switching arrangements, the method comprising the steps of:

building together at least a number of multiplexing arrangements with a number of switching arrangements, to form combined multiplexing-switching units, and introducing protection switching arrangements on different levels of the system by arranging a common protection switching arrangement which provides protection switching both for the combined multiplexing-switching units and for access units so that the protection switching is handled by the common protection switching arrangement in the same way both between combined multiplexing-switching units and access units and towards the telecommunications network.

21. A method according to claim 20, further comprising the steps of controlling a central switching arrangement from a time switch multiplexing unit so that protection switching for the central switching arrangement indirectly is provided by the common protection switching arrangement.

* * * * *